Feb. 7, 1961 O. B. OLSEN 2,970,377
PRE-SPLICING TOOL FOR REMOVING COVERING FROM CABLE
Filed Aug. 31, 1959 2 Sheets-Sheet 1

INVENTOR.
Olger B. Olsen
BY
Garvey + Garvey
ATTYS

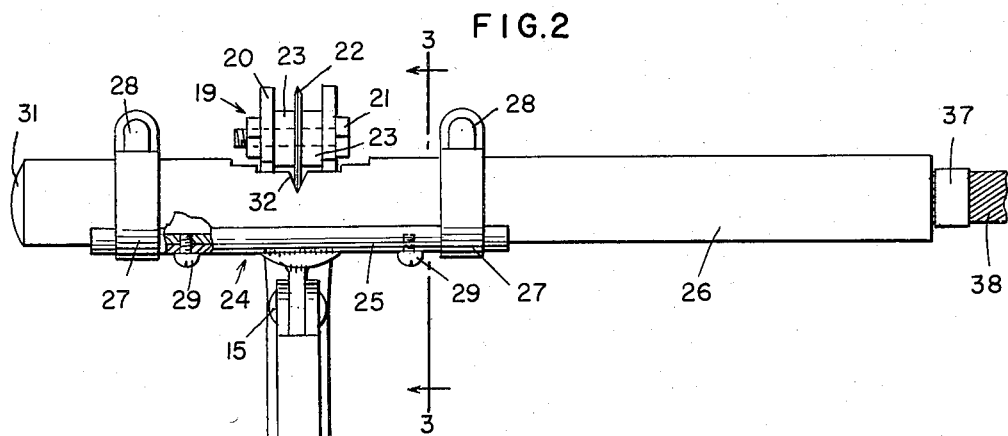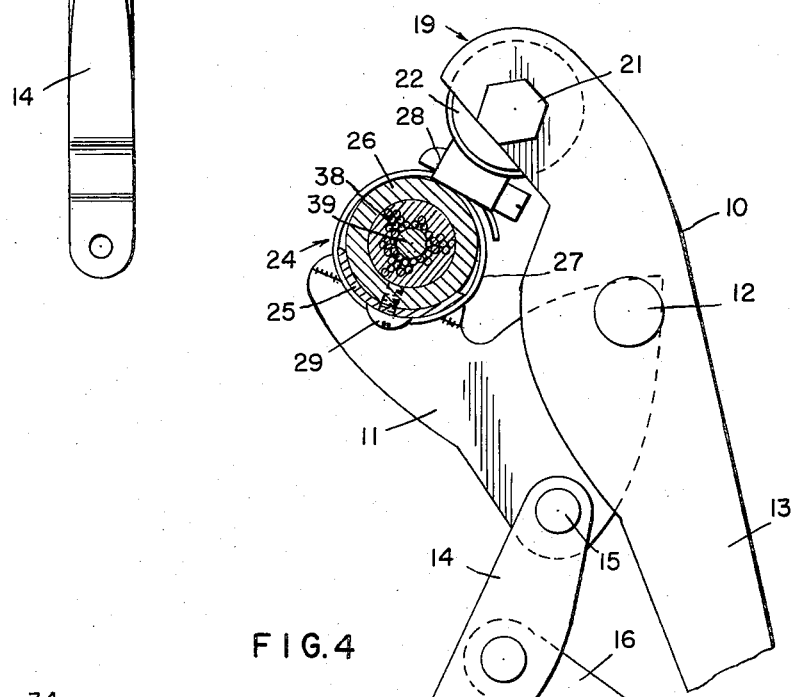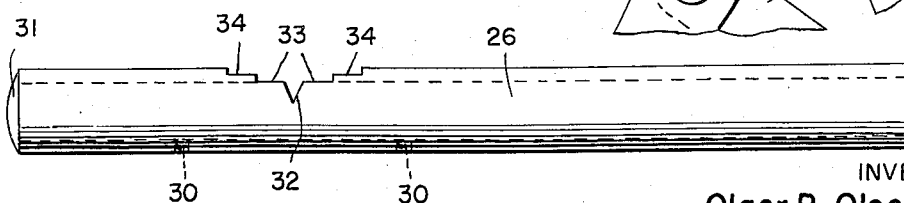

United States Patent Office 2,970,377
Patented Feb. 7, 1961

2,970,377
PRE-SPLICING TOOL FOR REMOVING COVERING FROM CABLE

Olger B. Olsen, Karlstad, Minn.

Filed Aug. 31, 1959, Ser. No. 837,110

9 Claims. (Cl. 30—102)

This invention relates to a pre-splicing tool for removing the outer covering from cable and is particularly adapted for use on aluminum cable steel-reinforced conductors employed in transmitting electricity.

Aluminum cable steel reinforced conductors are conventionally compression spliced by means of an inner steel sleeve which splices the steel core strand, or strands, and an outer sleeve of thick aluminum for splicing the outer aluminum stands. Various ways have been devised for stripping the aluminum strands from the steel core preparatory to splicing in the present manner, illustrative of which is Patent No. 2,735,175, granted February 21, 1956, to J. R. Tallman. With the device of that invention, as with others heretofore employed, it is necessary that a ruler, or other measuring instrument, be used to determine the length of cable covering to be removed and there is considerable danger that in the stripping operation the steel core will be nicked or scratched with resultant well known harmful effects. Also, it frequently happens that the outer aluminum sleeve is not centered over the inner steel sleeve which greatly reduces the conductivity of the splice and results in heating of the steel core to the point of burning off.

It is, therefore, an object of this invention to provide a pre-splicing tool including a measuring guide and depth gauge for automatically determining the length and thickness of the outer covering section of a cable to be stripped from the cable core preparatory to removal of the same for splicing.

Other objects are to provide a pre-splicing tool for aluminum cable steel reinforced conductors designed to cut and remove the exact number of other aluminum strands without damaging the core thereof; to provide a pre-splicing tool of the character described including means for centering the outer sleeve of the splice over the inner sleeve thereof; to provide a pre-splicing tool which is light-weight and readily handled by mechanics or linemen working on poles or towers off platforms or catwalks; and to provide a pre-splicing tool which facilitates preparation of cable for splicing and automatically insures a correct splice without the use of extraneous devices or tools.

Other objects of the invention will be manifest from the following description of the present preferred form of the invention taken in connection with the accompanying drawings, wherein:

Figure 2 is a front elevational view of the same showing the tool in operative position;

Figure 3 is an enlarged sectional view taken along the lines 3—3 of Figure 2 looking in the direction of the arrows;

Figure 4 is a plan view of the measuring guide and depth gauge per se, forming a part of the present invention;

Figure 1:
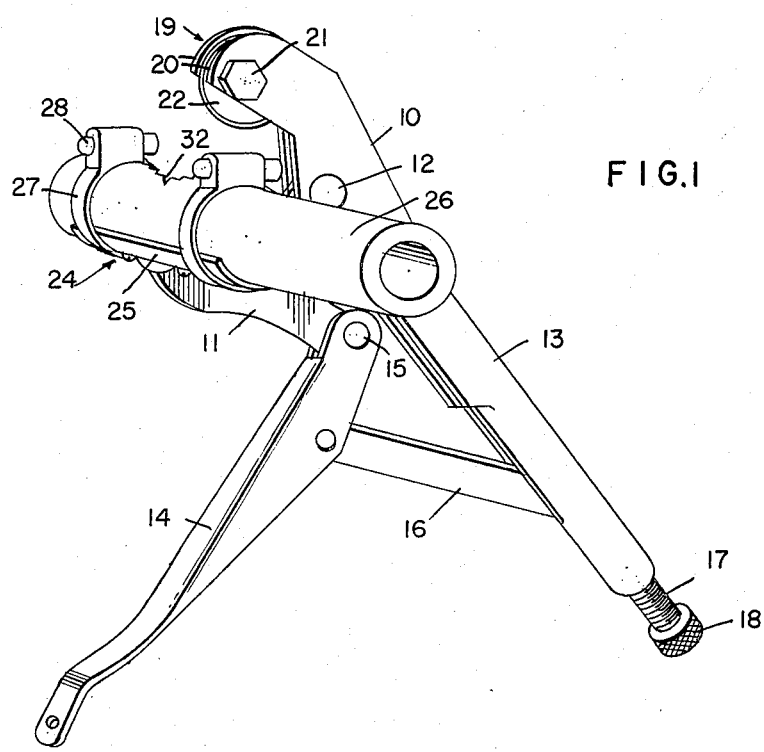
Figure 1 is a perspective view of the pre-splicing tool of the present invention showing the same in inoperative position.
Figure 6:
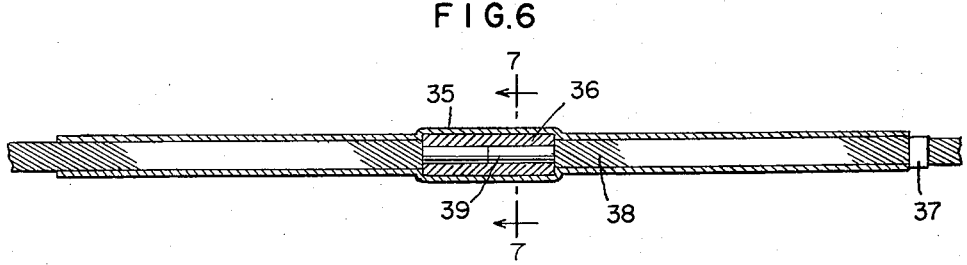
Figure 6 is a longitudinal sectional view of the same.
Figure 5:
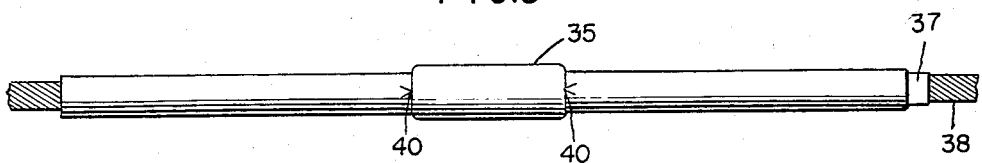
Figure 5 is a plan view of a conductor cable illustrating a compression splicing made in accordance with the present invention.
Figure 7:
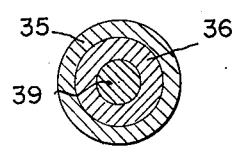
Figure 7 is a transverse sectional view taken along the line 7—7 of Figure 6 looking in the direction of the arrows.

Referring now in greater detail to the drawings and in particular to Figs. 1, 2 and 3 thereof, the pre-splicing tool of the present invention is basically of the same construction as a conventional locking plier wrench, which includes an upper jaw 10 and a lower jaw 11 pivotally connected at 12. Jaw 10 issues into a handle 13 and a handle 14 is pivotally connected to lower jaw 11 at 15. A pivot arm 16 extends from handle 13 to handle 14 at a point intermediate their lengths. A feed jack 17 operated by a knurled knob 18 extends from the lowermost extremity of handle 13 and serves to urge jaws 10 and 11 together in a well known manner.

In accordance with the teaching of the present invention upper jaw 10 is equipped with a cutter assembly 19. Assembly 19 includes a bifurcated portion issuing from jaw 10, the furcations being indicated at 20. As shown in Fig. 2, each furcation is provided with a perforation through which a mounting shaft assembly 21 passes. Rotatably mounted on shaft 21 between furcations 20 is a cutting wheel 22 spaced from the furcation by suitable members 23.

In connection with cutter assembly 19, lower jaw 11 is equipped with a measuring guide and depth gauge assembly 24. This assembly includes an arcuate support 25 centrally fixed to the upper extremity of jaw 11 by welding or other suitable means. Support 25 is adapted to hold a tool sleeve 26 which is detachably secured to the support by spiral clamps 27 which are adjusted by suitable means 28. Centering of sleeve 26 is effected by studs or bolts 29 carried by support 25 and adapted to engage recesses 30 in sleeve 26. As shown to advantage in Fig. 4, tool sleeve 26 is of tubular construction, one end of which is open for the reception of a cable, and the other end thereof is capped, as indicated at 31, to limit the entry of the cable into the sleeve. At a predetermined point intermediate its length, tool sleeve 26 is provided with a V-shaped notch 32 adapted to receive cutting wheel 22, adjacent both sides of which V-notch sleeve 26 is provided with stepped notches 33 and 34 adapted to receive portions of cutter assembly 19 in order to allow penetration of cutting wheel 22 to the maximum extent in V-notch 32.

The internal diameter of tool sleeve 26 corresponds to the outer diameter of the conductor cable to be spliced and the length of the sleeve is one-half the length of the outer aluminum splicing sleeve designated 35. Consequently, the centering of outer sleeve 35 with respect to the inner steel splicing sleeve designated 36 may be readily effected by placing a piece of tape 37 or other suitable marker on one piece of the conductor cable uniplanar with the terminal of the open end of tool sleeve 26. Additionally, notch 32 of sleeve 26 is so located that the distance between the apex thereof and cap 31 equals one-half the length of inner steel splicing sleeve 36 plus 3/8 of an inch. This assures stripping of the conductor cable to be spliced to exactly correspond to the dimensions of sleeve 36, the added 3/8 of an inch allowing for expansion of the sleeve as it is compressed during the splicing operation. The depth of V-notch 32 is also predetermined so that when cutting wheel 22 is at its lowermost position, it will cut aluminum strands 38 without damaging steel core 39 thereof.

It will be apparent from the foregoing that the diameter, length and position of V-notch 32 of tool sleeve 26 will vary with different size conductor cables calling for different size splicing members. It is, therefore, within the contemplation of the present invention to provide tool sleeves of different sizes adapted to be used interchangeably and perform the pre-slicing operation for any size conductor cable which is employed.

In use of the device of the present invention, the appropriate tool sleeve 26 is selected, the inside diameter of which is the same as the outside diameter of the conductor cables to be spliced. The tool sleeve is then placed on support 32 and screws 29 threadedly engaged with recess 30 of the tool sleeve to properly position the latter with respect to cutter assembly 19. Spiral clamps 27 are then tightened by means 28 to firmly hold the tool sleeve on the support. Outer aluminum splicing sleeve 35 is slipped over one end of the conductor cable and pushed back several inches, following which the cable is inserted into the open end of tool sleeve 26 until it engages the cap end 31 thereof. At this time the cutter assembly is in the position shown in Fig. 1.

Handle 14 of the tool is urged towards handle 13 to move tool sleeve 26 into proximity of cutter assembly 19. Knurled knob 18 is then rotated to actuate feed jack 17 to move tool sleeve 26 and the conductor cable into engagement with cutting wheel 22. By holding the cable adjacent tool sleeve 26 and rotating the tool about the cable, an incision is made in the aluminum outer strands of the cable. Feed jack 17 is again tightened and the operation is repeated with the result that, upon each revolution, the incision is deepened. This is continued until cutting wheel 22 is uniplanar with the lowermost portion of V-notch 32, after which feed jack 17 is loosened so that tool sleeve 26 may be removed from the cable to the point where the incision in the cable is visible. Then, by holding the cable firmly in one hand and moving the tool sleeve in a to-and-fro motion, aluminum strands 38 are freed from the steel core or strands 39. In stripping the other cable to be spliced, the above operation is repeated with the exception that a piece of tape 37, or other suitable marker, is wrapped around the cable at a point uniplanar with the terminal of the open end of the tool sleeve (see Fig. 2). This marks the location on the cable for the exact centering of outer splicing sleeve 35.

In splicing the stripped terminals of the conductor cable together, the ends thereof are inserted into steel sleeve 36 which is then compressed from the center outwardly about steel core 39 and, when compressed, abuts aluminum strands 38. Aluminum outer sleeve 35 previously slipped over the conductor cable prior to the pre-splicing operation is then slid over the steel splicing sleeve until one terminal thereof is flush with marking tape 37 around the other piece of conductor cable. Sleeve 35 is then compressed from markings 40 on the sleeve outwardly to the extremities thereof, thereby leaving the central portion thereof, which is coextensive with, and in surrounding engagement with, inner steel sleeve 36, uncompressed.

While I have herein shown and described a preferred embodiment of my invention, it is nevertheless to be understood that various changes may be made therein without departing from the spirit and scope of the appended claims.

What I claim is:

1. A pre-slicing tool for removing the covering from a conductor cable including a gauge sleeved on the cable and provided with a notch to fix the depth of penetration of an incision made in the cable covering, and an assembly embracing the cable-contained gauge, the assembly comprising a cutter and a support, the cutter being engageable in said notch, opposite the support, to effect cutting the covering when the assembly is moved in an orbital path around the cable.

2. A pre-splicing tool for removing the covering from a conductor cable to expose the core thereof, comprising a cutter, a support mounted subjacent said cutter and a measuring guide and depth gauge assembly carried by said support, for automatically determining the portion of the covering to be removed, said measuring guide and depth gauge assembly being adapted for the reception of the conductor cable.

3. A pre-splicing tool as set out in claim 2 wherein the measuring guide and depth gauge assembly comprises a tubular member, said tubular member being provided with a notch in the path of said cutter to fix the depth of penetration of an incision made in the cable covering.

4. A pre-splicing tool for removing the covering from a conductor cable, as set out in claim 3, wherein one end of said tubular member is capped to limit the entry of the conductor cable into said tubular member.

5. A pre-splicing tool for removing the covering from a conductor cable, as set out in claim 3, wherein the length of said tubular member equals one-half the length of an outer splicing member, to facilitate centering of said splicing member over a conductor cable splice.

6. A pre-splicing tool for removing the covering from a conductor cable to expose the core, prior to application of inner and outer splicing members thereto, including a measuring guide and depth gauge assembly comprising a tubular member capped at one end and provided at a point intermediate its length with a notch to fix the depth of penetration of an incision made in the cable covering, the internal diameter of said tubular member being substantially equal to the diameter of the conductor cable to be spliced and the depth of the notch being equal to the thickness of the conductor cable covering, and an assembly embracing the cable-contained gauge, the assembly comprising a cutter and a support, the cutter being engageable in said notch, opposite the support, to effect cutting the covering when the assembly is moved in an orbital path around the cable.

7. A pre-splicing tool as set out in claim 6, wherein the distance between the notch and the capped end of the tubular member is approximately equal to one-half the length of the inner splicing member, and the overall length of the tubular member equals one-half the length of the outer splicing member.

8. A pre-splicing tool for removing the covering from a conductor cable to expose the core, prior to application of inner and outer splicing members thereto, the tool comprising an upper jaw, a lower jaw pivotally connected to said upper jaw, means for urging said jaws together, a cutter assembly mounted on said upper jaw, a measuring guide and depth gauge assembly supported on said lower jaw, said guide and depth gauge assembly including an arcuate support, a tool sleeve of cylindrical shape detachably secured to said arcuate support, said tool sleeve being open at one end and closed at the other end to limit the entry of the cable into the sleeve, a V notch of predetermined depth in said tool sleeve in the path of said cutter assembly to fix the depth of penetration of an incision made in the cable covering, the distance between the apex of the V notch and the closed end of the sleeve being approximately one-half the length of the inner splicing sleeve, the overall length of said tool sleeve being equal to one-half the length of the outer splicing member, to facilitate centering of the latter over the cable to be spliced.

9. A pre-slicing tool as set out in claim 8 wherein the internal diameter of the cylindrical sleeve is substantially equal to the diameter of the conductor cable to be spliced, and the depth of the V notch equals the thickness of the conductor cable covering.

References Cited in the file of this patent

UNITED STATES PATENTS 2,683,930     Walters _____ July 20, 1954
2,735,175     Tallman _____ Feb. 21, 1956